US008763051B2

(12) United States Patent
Nam

(10) Patent No.: US 8,763,051 B2
(45) Date of Patent: Jun. 24, 2014

(54) METHOD AND APPARATUS FOR RECEIVING SIGNAL

(75) Inventor: Cha Hee Nam, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 381 days.

(21) Appl. No.: 12/826,310

(22) Filed: Jun. 29, 2010

(65) Prior Publication Data

US 2011/0050908 A1 Mar. 3, 2011

(30) Foreign Application Priority Data

Sep. 1, 2009 (KR) .................. 10-2009-0082200

(51) Int. Cl.
*H04N 7/173* (2011.01)
*H04N 7/20* (2006.01)
*H04N 7/18* (2006.01)
*H04N 7/16* (2011.01)

(52) U.S. Cl.
USPC ................ 725/81; 725/68; 725/131; 725/139

(58) Field of Classification Search
None
See application file for complete search history.

(56) References Cited

U.S. PATENT DOCUMENTS

| 8,255,564 B2* | 8/2012 | Fillebrown et al. ........... 709/238 |
| 2006/0187921 A1* | 8/2006 | Iwasaki ........................ 370/389 |
| 2007/0091168 A1* | 4/2007 | Lee ............................. 348/14.01 |
| 2007/0183350 A1* | 8/2007 | Walker et al. ................. 370/310 |
| 2009/0092039 A1 | 4/2009 | Niu et al. |
| 2009/0135311 A1 | 5/2009 | Kurita et al. |
| 2010/0128696 A1* | 5/2010 | Fantini et al. ................. 370/331 |
| 2012/0185904 A1* | 7/2012 | Dey ............................... 725/87 |

FOREIGN PATENT DOCUMENTS

| JP | 2009-130874 A | 6/2009 |
| KR | 10-2008-0021460 A | 3/2008 |
| KR | 10-2009-0034708 A | 4/2009 |

* cited by examiner

*Primary Examiner* — Ricky Chin
(74) *Attorney, Agent, or Firm* — Birch, Stewart, Kolasch & Birch, LLP

(57) ABSTRACT

A method of controlling devices, and which includes converting, via a transmitting apparatus, a signal including at least one of the video/audio and data into a first definition wireless signal, transmitting, via the transmitting apparatus, the converted first definition wireless signal to a receiving apparatus, receiving, via the receiving apparatus, the first definition wireless signal, extracting, via the receiving apparatus, the at least one of the video/audio and data included in the first definition wireless signal, detecting, via a detector on the receiving apparatus, a quality of the received first definition wireless signal, and comparing, via a processor on the receiving apparatus, the detected quality of the received first definition wireless signal with a predetermined value, and transmitting a first command to the transmitting apparatus to transmit a second definition wireless signal including the at least one of the video/audio and data to the receiving apparatus, when the detected quality of the received first definition wireless signal is lower than the predetermined value, the first and second definition wireless signals using different wireless communication standards.

23 Claims, 5 Drawing Sheets

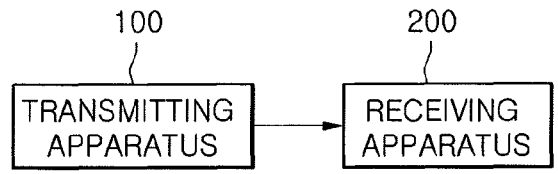
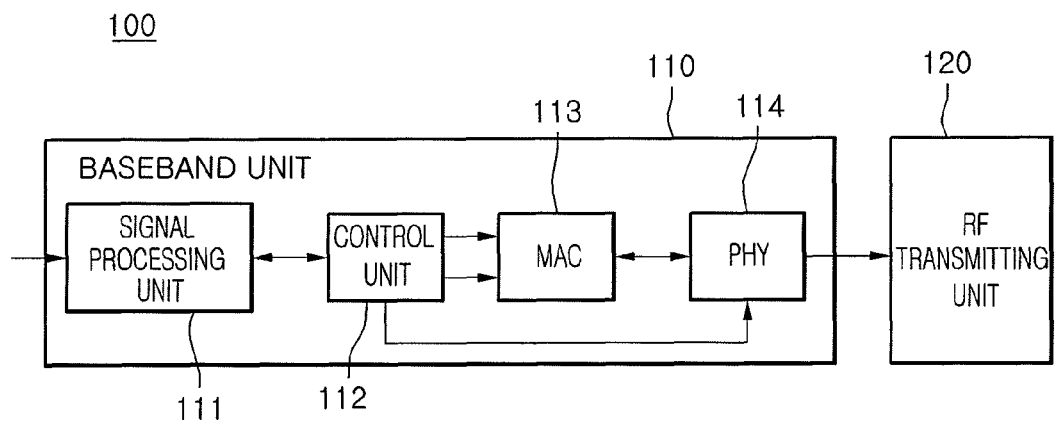
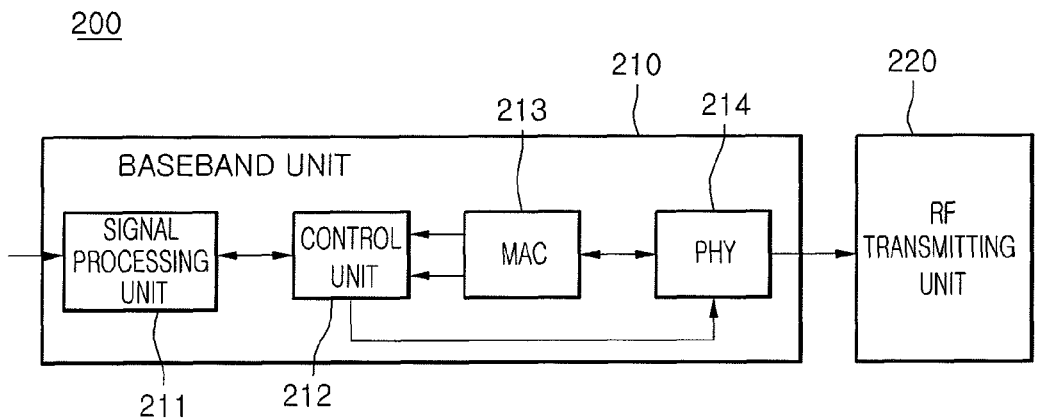

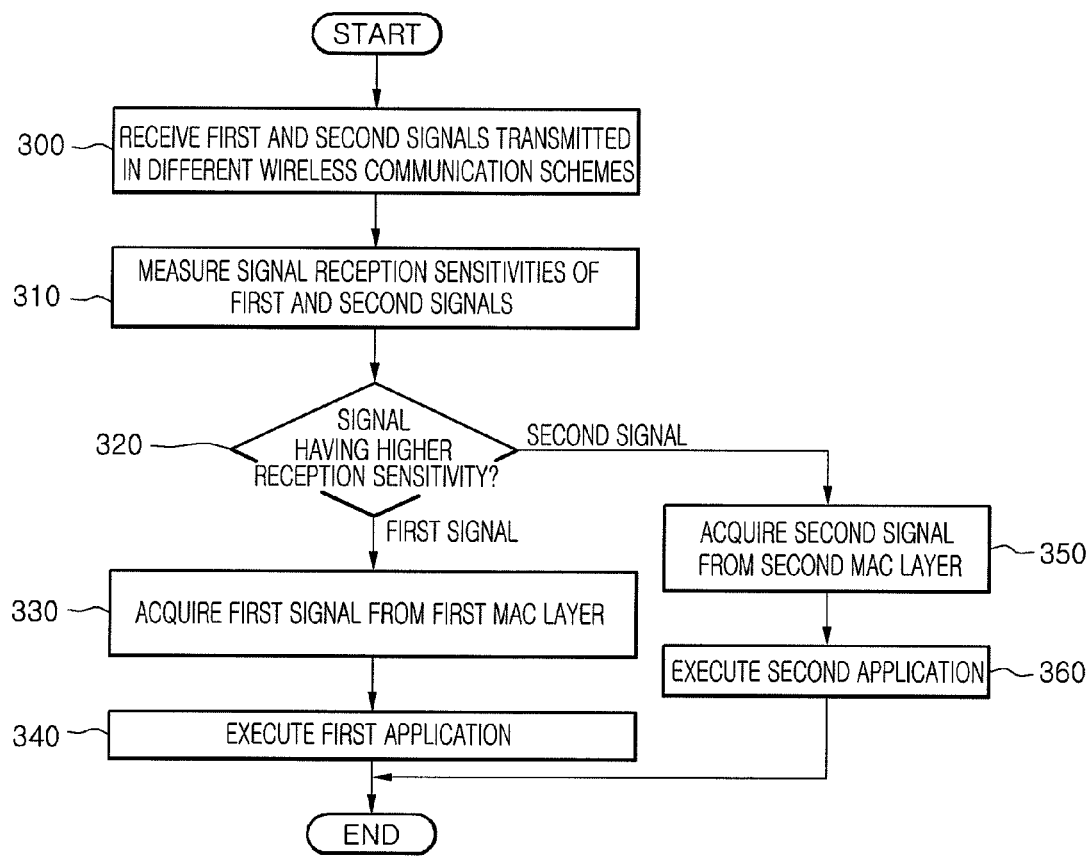

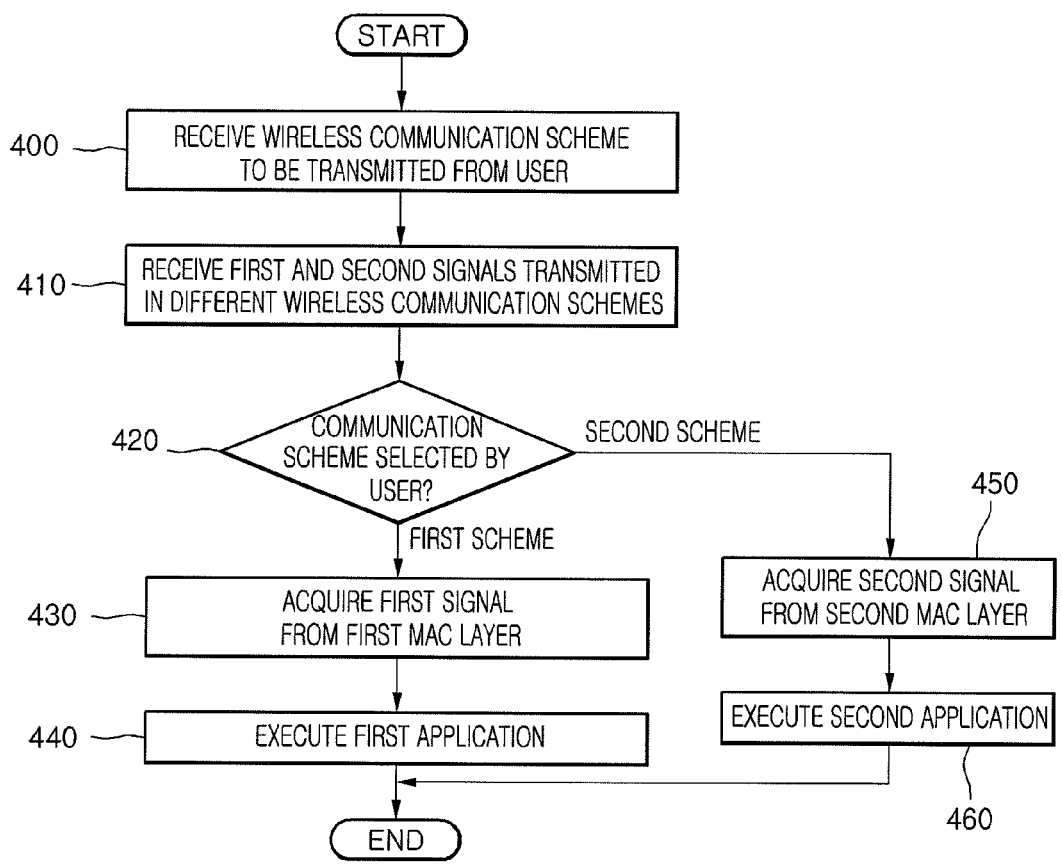

METHOD AND APPARATUS FOR RECEIVING SIGNAL

CROSS-REFERENCE TO RELATED APPLICATIONS

Pursuant to 35 U.S.C. §119(a), this application claims the benefit of earlier filing date and right of priority to Korean Application No. 10-2009-008220, filed on Sep. 1, 2009, the contents of which is hereby incorporated by reference herein in its entirety.

FIELD OF THE INVENTION

The present invention relates to a method and an apparatus for transmitting and receiving a media signal using different wireless communication techniques.

DISCUSSION OF THE RELATED ART

A display device includes a receiving unit that receives a media signal including video and audio from a broadcasting system, a cable system, and other external apparatuses (VCR, DVD, etc.) and processes and outputs the received media signal on a display of the display device. Further, the receiving unit may be physically separated from the display device. In recent years, a wireless type display system has been provided, which transmits a media signal received using an additional receiver to the display device through wireless communication and displays the transmitted media signal on the display.

SUMMARY OF THE INVENTION

Accordingly, one object of the present invention is to provide a method and an apparatus for efficiently transmitting and receiving a media signal using wireless communication.

To achieve these and other advantages and in accordance with the purpose of the present invention, as embodied and broadly described herein, the present invention provides in one aspect a method of controlling devices, and which includes converting, via a transmitting apparatus, a signal including at least one of the video/audio and data into a first definition wireless signal, transmitting, via the transmitting apparatus, the converted first definition wireless signal to a receiving apparatus, receiving, via the receiving apparatus, the first definition wireless signal, extracting, via the receiving apparatus, said at least one of the video/audio and data included in the first definition wireless signal, outputting said at least one of the video/audio and data included in the first definition wireless signal on the receiving apparatus, detecting, via a detector on the receiving apparatus, a quality of the received first definition wireless signal, and comparing, via a processor on the receiving apparatus, the detected quality of the received first definition wireless signal with a predetermined value, and transmitting a first command to the transmitting apparatus to transmit a second definition wireless signal including said at least one of the video/audio and data to the receiving apparatus, when the detected quality of the received first definition wireless signal is lower than the predetermined value, the first and second definition wireless signals using different wireless communication standards. A corresponding system for controlling devices is also provided.

In still another aspect, the present invention provides a television including a receiver configured to receive a first definition wireless signal including at least one of video/audio and data from an external device, a processor configured to extract said at least one of the video/audio and data included in the first definition wireless signal, and an output device configured to output said at least one of the video/audio and data included in the first definition wireless signal. Further, the processor is further configured to detect a quality of the received first definition wireless signal, to compare the detected quality of the received first definition wireless signal with a predetermined value, and to transmit a first command to a second transmitting apparatus associated with the external device to transmit a second definition wireless signal including said at least one of the video/audio and data to the television, when the detected quality of the received first definition signal is lower than the predetermined value, said first and second definition wireless signals using different wireless communication standards. A method of controlling a television is also provided.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

FIG. 1 is a block diagram illustrating a signal transmitting/receiving system according to an embodiment of the present invention;

FIG. 2 is a block diagram illustrating a transmitting apparatus according to an embodiment of the present invention;

FIG. 3 is a block diagram illustrating a receiving apparatus according to an embodiment of the present invention;

FIG. 4 is a flowchart illustrating a method for receiving a signal according to a first embodiment of the present invention;

FIG. 5 is a flowchart illustrating a method for receiving a signal according to a second embodiment of the present invention;

DETAILED DESCRIPTION OF PREFERRED EMBODIMENTS

Figure 6:
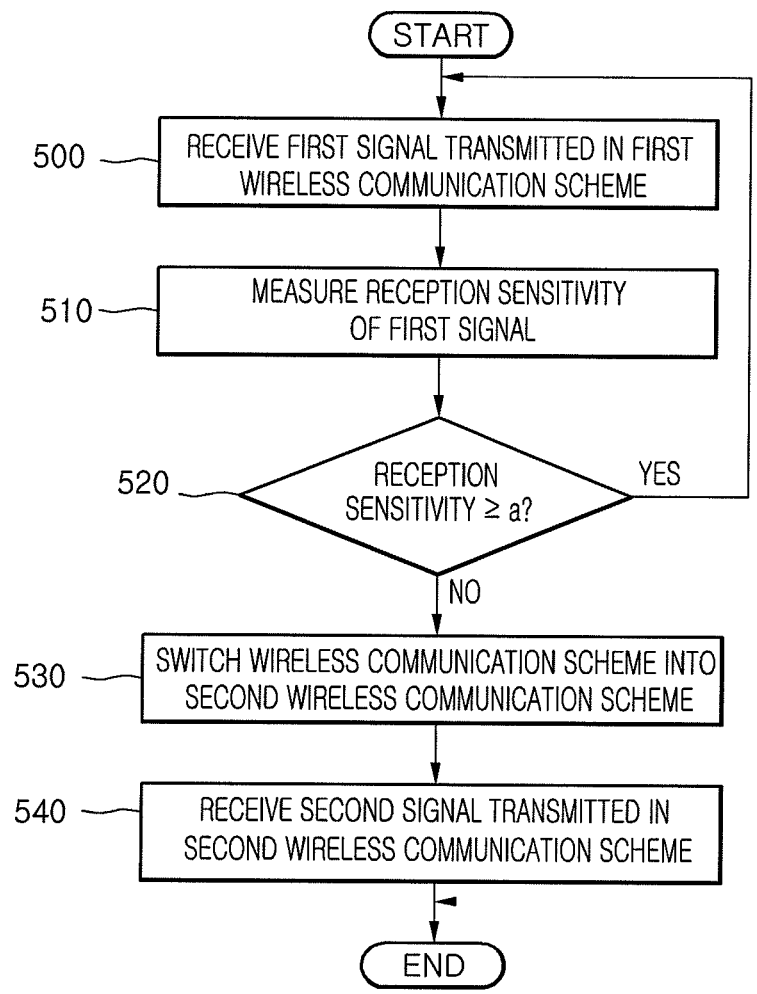
FIG. 6 is a flowchart illustrating a method for receiving a signal according to a third embodiment of the present invention.

Hereinafter, a method for receiving a signal, a transmitting/receiving apparatus and a display apparatus thereof according to embodiments of the present invention will be described in detail with reference to the accompanying drawings.

FIG. 1 is a block diagram illustrating a signal transmitting/receiving system according to an embodiment of the present invention. As shown, the transmitting/receiving system includes a transmitting apparatus 100 and a receiving apparatus 200. In more detail, the transmitting apparatus 100 receives a media signal from a broadcasting system, a cable system, or external apparatuses, converts the received media signal into data of a wireless transmittable format and then wirelessly transmits the data.

In addition, the receiving apparatus 200 receives and processes the media signal wirelessly transmitted from the transmitting apparatus 100. To perform this operation, one or more wireless communication standards for wirelessly transmitting and receiving the media signal can be previously established between the transmitting apparatus 100 and the receiving apparatus 200. Also, the transmitting apparatus 100 includes various input terminals such as a high-definition multimedia interface (HDMI) terminal connected with an antenna or external apparatuses, a universal serial bus (USB) terminal, a component terminal, an external input terminal, an RGB terminal, an antenna cable terminal, etc. and can receive the media signal using the input terminals. For example, the broadcasting signal may include a media signal received using the antenna, a cable, or the like or video and audio signals received from connected external devices in the transmitting apparatus 100.

In addition, the transmitting apparatus 100 may be a set-top box (STB) that receives the media signal using a wired or wireless network, and converts and wireless transmits the received media signal to the receiving apparatus 200. However, the transmitting apparatus 100 is not limited to the set-top box (STB) and can include all types of devices that can receive the media signal transmitted from the outside and wirelessly transmit the received media signal to the receiving apparatus 200. For example, the transmitting apparatus 100 can be implemented by being provided in a computer or a portal terminal such as a cellular phone, etc.

Further, the receiving apparatus 200 receives and processes the signal wirelessly transmitted from the transmitting apparatus 100, and thereafter can transmit the data to an external apparatus that outputs the video or audio included in the signal. For example, the receiving apparatus 200 can convert the media signal wirelessly transmitted from the transmitting apparatus 100 into a displayable format and output the video signal on a display device. More specifically, when the media signal wirelessly transmitted from the transmitting apparatus 100 is encoded by a coding scheme such as an MPEG, etc., the receiving apparatus 200 decodes the received video signal and outputs the decoded video signal to the display device.

Also, according to embodiments of the present invention, the transmitting apparatus 100 and the receiving apparatus 200 can transmit and receive the media signal using various wireless communication standards, for example, wireless communication standards such as wireless HD (WiHD), wireless home digital interface (WHDi), wireless Lan (WiFi), etc. In more detail, the WiHD uses a frequency band of approximately 60 GHz and can transmit and receive data at transmission rate of approximately 4 Gbps to thereby transmit HD video data of 1080p (1902×1080) without compression. However, WiHD uses a high frequency band of 60 GHz such that a data transmitting/receiving distance is approximately 10 m and the transmission/reception quality can be easily influenced by obstacles in the vicinity of an installation space.

In addition, WHDi can transmit and receive the data at a transmission rate of approximately 1.8 Gbps using a frequency band of approximately 5 GHz. Further, the WHDi uses a comparatively low frequency band of 5 GHz such that the data transmitting/receiving distance is approximately 30 m and the transmission/reception quality is not significantly influenced by the obstacles in the vicinity of the installation space. Meanwhile, when the HD video data of 1080p (1920× 1080) is transmitted using WHDi at the transmission rate of approximately 1.8 Gbps, the transmitting apparatus 100 partially compresses and transmits the HD video data.

Further, WiFi can transmit and receive the data at a transmission rate of approximately 54 Mbps using a frequency band of approximately 2.4 GHz. WiFi uses a comparatively low frequency band of 2.4 GHz such that the data transmitting/receiving distance is approximately 50 to 200 m and the transmission/reception quality is almost not at all influenced by the obstacles in the vicinity of the installation space. Meanwhile, when the HD video data of 1080p (1920×1080) is transmitted using WiFi at the low transmission rate of approximately 54 Mbps, the transmitting apparatus 100 can compress and transmit the HD video data and as a result, the image quality of the video signal received from the receiving apparatus 200 is generally not deteriorated.

In addition, the transmitting apparatus 100 and the receiving apparatus 200 can wirelessly transmit and receive the media signal using various short-range wireless communication standards, for example, communication standards such as Bluetooth, ZigBee, or binary code division multiple access (CDMA), etc. in addition to the above-mentioned wireless communication standards. Further, the transmitting apparatus 100 and the receiving apparatus 200 can transmit and receive video and audio data using a plurality of wireless communication standards of various wireless communication standards. That is, the transmitting apparatus 100 can support two or more communication standards, and convert the same media signal received from the outside into two or more signals and wirelessly transmits the signals in accordance with the wireless communication standards.

Further, the receiving apparatus 200 can also support the two or more wireless communication standards and can receive two or more signals wirelessly transmitted using different wireless communication standards from the transmitting apparatus 100. The receiving apparatus 200 can also select any one of two or more signals in accordance with different wireless communication standards, and convert the selected signal into a displayable format and output the converted signal. For example, the receiving apparatus 200 can select and process a signal depending on a wireless communication scheme to provide an optimum signal transmission/ reception performance in accordance with a current transmission environment, and more specifically, a distance between the transmitting and receiving apparatuses 100 and 200, an installation space, or the resolution of the transmission image.

Next, FIG. 2 is a block diagram illustrating the transmitting apparatus 100 according to an embodiment of the present invention. As shown, the transmitting apparatus 100 includes a baseband unit 110 and an RF transmitting unit 120. Further, the baseband unit 110 includes a media access control (MAC) layer 113 and a physical (PHY) layer 114. In addition, the signal processing unit 111 can process the media signal received from the outside and output the processed media signal to the control unit 112. For example, the signal processing unit 111 may include a frame buffer, store the video signal received from the outside in the frame buffer and output the video signal in accordance with a predetermined format.

The control unit 112 also controls an overall operation of the transmitting apparatus 100, for example, controls the signals output from the signal processing unit 111 to be converted into a wirelessly transmittable format in accordance with a predetermined wireless communication standard through the media access control (MAC) layer 113 and the physical (PHY) layer 114 and wirelessly transmitted through the RF transmitting unit 120. In addition, the media access control (MAC) layer 113 may include a plurality of media access control (MAC) layers corresponding to different communication schemes, respectively so that the transmitting apparatus 100 supports a plurality of different communication schemes.

That is, the media access control (MAC) layer 113 may include a first media access control (MAC) layer corresponding to a first wireless communication scheme and a second media access control (MAC) layer corresponding to a second wireless communication scheme different from the first wireless communication scheme. In addition, in one embodiment of the present invention, the transmitting apparatus 100 can support WiHD and WHDi, and to perform this function, the baseband 110 of the transmitting apparatus 100 includes a WiHD media access control (MAC) layer and a WHDi media access control (MAC) layer.

Hereinafter, the situation in which the transmitting apparatus 100 can support WiHD and WHDi will be given as an example, and an operation of the transmitting apparatus 100 will be described according to an embodiment of the present invention. In particular, the control unit 112 outputs the signal output from the signal processing unit 111 to each of the WiHD media access control (MAC) layer and the WHDi media access control (MAC) layer. The WiHD media access control (MAC) layer then converts the media signal into wirelessly transmittable data in accordance with a WiHD wireless communication standard, and the WHDi media access control (MAC) layer converts the media signal into wirelessly transmittable data in accordance with a WHDi wireless communication standard.

As described above, the signals converted in accordance with the WiHD and WHDi wireless communication standards can be transmitted to the RF transmitting unit 120 through the physical (PHY) layer 114, and the RF transmitting unit 120 can wirelessly transmit the first signal converted in accordance with WiHD and the second signal converted in accordance with WHDi. For example, the RF transmitting unit 120 can receive the first and second signals converted in accordance with WiHD and WHDi, respectively from the baseband 110 and wirelessly transmit the first and second signals using different frequency bands, that is, a frequency band of approximately 60 GHz for WiHD and a frequency band of approximately 5 GHz for WHDi. To do this operation, the RF transmitting unit 120 includes a wideband antenna and a converter corresponding to each of the frequency bands.

In addition, the RF transmitting unit 120 includes an up-converter and a down-converter corresponding to the frequency bands, respectively to transmit the signal and wirelessly receive the signal from the outside. Further, in the above description, the transmitting apparatus 100 can support WiHD and WHDi, for example, but this is just one embodiment of the present invention. That is, the transmitting apparatus 100 can support two or three or more wireless communication schemes among various wireless communication schemes. For example, as another embodiment of the present invention, the transmitting apparatus 100 can support WiHD and WiFi. To perform this operation, the baseband unit 110 of the transmitting apparatus 100 includes the WiHD media access control (MAC) layer and a WiFi media access control (MAC) layer.

Next, FIG. 3 is a block diagram illustrating the receiving apparatus 200 according to an embodiment of the present invention. As shown, the receiving apparatus 200 includes a baseband unit 210 and an RF receiving unit 220. Further, the RF receiving unit 220 can receive video and audio signals transmitted form the transmitting apparatus 100, and the received signal can be input into a signal processing unit 211 through a physical (PHY) layer 214 and a media access control (MAC) layer 213. For example, the signal processing unit 111 may include a frame buffer, store the received video signal in the frame buffer and output the video signal to execute the corresponding application.

In addition, the control unit 212 controls an overall operation of the receiving apparatus 200, for example, allows the video signal received through the RF receiving unit 220 to be converted into a displayable format through the physical (PHY) layer 214 and the media access control (MAC) layer 213 by the corresponding application. The media access control (MAC) layer 213 can also include a plurality of media access control (MAC) layers corresponding to different communication schemes, respectively so that the transmitting apparatus 200 supports a plurality of different communication schemes. Further, the receiving apparatus 200 can support WiHD and WHDi by including a WiHD media access control (MAC) layer and a WHDi media access control (MAC) layer.

Hereinafter, the situation in which the receiving apparatus 200 supports WiHD and WHDi will be given as an example, and an operation of the receiving apparatus 200 will be described in detail according to an embodiment of the present invention. In more detail, the RF receiving unit 220 can receive a first signal wirelessly transmitted using WiHD and a second signal wirelessly transmitted using WHDi. For example, the RF receiving unit 220 can receive the first and second signals transmitted from the transmitting apparatus 100 using different frequency bands, that is, a frequency band of approximately 60 GHz for WiHD and a frequency band of approximately 5 GHz for WHDi. To do this, the RF receiving unit 220 includes a wideband antenna and converters corresponding to the frequency bands.

In addition, the RF receiving unit 220 includes down-converters and up-converters corresponding to the frequency bands, respectively and can receive the signal and wirelessly transmit the signal to the outside as described above. The control unit 212 can also select any one signal of the received first signal depending on WiHD and the received second signal depending on WHDi. For example, the control unit 212 can select a signal of the first and second signals corresponding to the wireless communication scheme and provide the selected signal to the signal processing unit 211 by selecting a wireless communication scheme to provide an optimum signal transmission/reception performance in accordance with a current data transmission/reception environment between the transmitting and receiving apparatuses 100 and 200.

Further, the wireless communication scheme to provide the optimum transmission/reception performance may be input by a user through a user input unit provided in the transmitting apparatus 100 or the receiving apparatus 200. Alternatively, the control unit 212 can measure reception signal sensitivities of the received first and second signals, and select a signal having the high measured reception sensitivity of the first and second signals and provide the signal to the signal processing unit 211. Also, the data transmission/reception performance between the transmitting apparatus 100 and the receiving apparatus 200 that wirelessly transmit and receive data, that is a signal reception sensitivity in which the signal transmitted from the transmitting apparatus 100 is received in the receiving apparatus 200 may be influenced by a distance between the transmitting apparatus 100 and the receiving apparatus 200, existence of an adjacent obstacle, etc.

In particular, when transmitting and receiving the data between the transmitting apparatus 100 and the receiving apparatus 200 using WiHD having a high frequency band of dozens of GHzs, for example, a frequency band of approximately 60 GHz, a data transmission/reception distance is short at approximately 10 m and the signal reception sensitivity may be influenced depending on the adjacent obstacle by high linearity. Further, when the signal reception sensitivity decreases as described above, the data between the transmitting apparatus 100 and the receiving apparatus 200 may be lost, thereby deteriorating the quality of an image displayed when received through the receiving apparatus 200.

As described above, WiHD is fast in transmission speed to transmit HD image data through non-compression, but the transmission/reception distance is short (e.g., approximately 10 m) and transmission/reception quality may easily be influenced by the adjacent obstacles of an installation space, while WHDi is slower in transmission speed to transmit the HD image data through compression, but the transmission/reception distance is long (e.g., approximately 30 m) and the transmission/reception quality may not be influenced by adjacent obstacles of the installation space.

Therefore, when the distance between the transmitting apparatus 100 and the receiving apparatus 200 is long, for example, when the distance is 10 m or more, the control unit 212 of the receiving apparatus 200 selects the second signal of the first and second signals, which is transmitted via WHDi. Further, when obstacles exist between the transmitting apparatus 100 and the receiving apparatus 200, the transmitting apparatus 100 and the receiving apparatus 200 are installed in different spaces divided by a wall, etc., the control unit 212 of the receiving apparatus 200 selects the second signal of the first and second signals, which is transmitted via WHDi.

Further, the control unit 212 can measure or detect a distance between the transmitting apparatus 200 and the receiving apparatus using a laser, for example, or other detection mechanism. The control unit 212 can also determine if there are any obstacles placed between the transmitting apparatus 200 and the receiving apparatus 100. The control unit 212 can then select the best wireless transmission method. The quality of the received signal or the bit error rate can also be used to select the best wireless transmission method as discussed above.

Meanwhile, when the HD image data is transmitted from the transmitting apparatus 100, the control unit 212 selects the first signal of the first and second signals, which is transmitted via WiHD. Thus, it is possible to prevent the quality of an image from being deteriorated due to compression by selecting and via WiHD. However, even in this instance, the distance between the transmitting apparatus 100 and the receiving apparatus 200 and whether or not obstacles exist are preferably considered as described above. Further, the user can previously set any one of WiHD and the WHDi to a wireless communication scheme of the transmitting and receiving apparatuses 100 and 200 by considering the distance between the transmitting and receiving apparatuses 100 and 200 that are currently installed, the installation space, or the resolution of the transmitted image.

In the above description, the receiving apparatus 200 can support WiHD and WHDi, for example, and this is just one embodiment of the present invention. That is, the receiving apparatus 200 can support two or three or more wireless communication schemes among various wireless communication schemes. For example, as another embodiment of the present invention, the receiving apparatus 200 can support WiHD and WiFi by including the WiHD media access control (MAC) layer and the WiFi media access control (MAC) layer.

In addition, WiFi is slower at approximately 54 Mbps, but the transmission/reception distance is longer (e.g., approximately 50 to 200 m) and the transmission/reception quality is not significantly influenced by the adjacent obstacles of the installation space such that when the distance between the transmitting apparatus 100 and the receiving apparatus 200 is long such as 10 m or more or obstacles exist between the transmitting apparatus 100 and the receiving apparatus 200 as described above, the control unit 212 of the receiving apparatus 200 selects the signal transmitted via WiFi among the received signals.

Hereinafter, embodiments of a method for receiving a signal in the receiving apparatus 200 according to the present invention will be described in more detail with reference to FIGS. 4 and 5. In particular, FIG. 4 is a flowchart illustrating a method for receiving a signal according to a first embodiment of the present invention. FIG. 3 will also be referred to throughout the description of the present invention.

Referring to FIG. 4, the RF receiving unit 220 receives the first and second signals transmitted from the transmitting apparatus 100 in different wireless communication schemes (step 300). As one embodiment of the present invention, the transmitting apparatus 100 can transmit the first signal using WiHD, and transmit the second signal using WHDi. Meanwhile, the first and second signals include the same video and audio depending on the media signal which the transmitting apparatus 100 receives and are signals converted in a wirelessly transmittable format in accordance with different wireless communication schemes.

Further, the received first and second signals may be the media signal including the video and the audio or a pilot which is a signal for measuring the reception sensitivity. The control unit 212 also measures the signal reception sensitivity of each of the received first and second signals (step 310). For example, the control unit 212 can measure a received signal strength indicator (RSSI) and a packet error rate (PER) of each of the first and second signals. Thereafter, the control unit 212 determines a signal having the higher reception sensitivity of the first and second signals by using the measured signal reception sensitivity (step 320).

For example, a signal having the high received signal strength indicator (RSSI) of the first and second signals may be a signal having the high reception sensitivity, and a signal having the low packet error rate (PER) of the first and second signals may be a signal having the high reception sensitivity. When the first signal of the first and second signals has the higher reception sensitivity, the control unit 212 acquires the first signal from the media access control (MAC) layer 213 (step 330). Also, the received first signal is provided to the corresponding application and the application is executed such that the first signal is processed (step 340).

For example, when the first signal is the signal transmitted via WiHD, the control unit 212 can receive and output the signal of the WiHD media access control (MAC) layer to the signal processing unit 211, and the signal processing unit 211 can process the signal by executing a WiHD application to process the signal. Meanwhile, when the second signal of the first and second signals has the higher reception sensitivity, the control unit 212 acquires the second signal from the media access control (MAC) layer 213 (step 350). The received second signal is then provided to the corresponding application and the application is executed such that the second signal is processed (step 360). For example, when the second signal is the signal transmitted via WHDi, the control unit 212 can receive and output the signal of the WHDi media access control (MAC) layer to the signal processing unit 211 and the signal processing unit 211 can process the signal by executing a WHDi application to process the signal.

Next, FIG. 5 is a flowchart illustrating a method for receiving a signal according to a second embodiment of the present invention. Referring to FIG. 5, a wireless communication scheme to receive the media signal is first input from the user, that is, a wireless communication scheme for transmitting/receiving the data between the transmitting apparatus 100 and the receiving apparatus 200 (step 400). To perform this operation as discussed above, the transmitting apparatus 100 or the receiving apparatus 200 includes a user input unit. The RF receiving unit 220 then receives the first and second signals transmitted from the transmitting apparatus 100 in first and second schemes which are different wireless communication schemes (step 410). For example, the first and second schemes may be WiHD and WHDi, respectively.

The control unit 212 then verifies the wireless communication scheme input from the user at step 400 (step 420). When the wireless communication scheme input from the user is the first scheme, the control unit 212 acquires the first signal transmitted in the first scheme of the first and second signals from the media access control (MAC) layer 213 (step 430). The received first signal is also provided to the corresponding application and the application is executed such that the first signal is processed (step 440). For example, when the first scheme input by the user is WiHD, the control unit 212 can receive and output the signal of the WiHD media access control (MAC) layer to the signal processing unit 211, and the signal processing unit 211 can process the signal by executing a WiHD application to process the signal.

In addition, when the wireless communication scheme input from the user is the second scheme, the control unit 212 acquires the second signal transmitted in the second scheme of the first and second signals from the media access control (MAC) layer 213 (step 450). The received second signal is then provided to the corresponding application and the application is executed such that the second signal is processed (step 460). For example, when the second scheme input by the user is WHDi, the control unit 212 can receive and output the signal of the WHDi media access control (MAC) layer to the signal processing unit 211, and the signal processing unit 211 can process the signal by executing a WHDi application to process the signal.

Next, FIG. 6 is a flowchart illustrating a method for receiving a signal according to a third embodiment of the present invention. Referring to FIG. 6, the RF receiving unit 220 receives the first signal transmitted from the transmitting apparatus 100 in the first wireless communication scheme (step 500). For example, the first wireless communication scheme may be WiHD, and therefore the RF receiving unit 220 can receive the first signal depending on the WiHD from the transmitting apparatus 100. The control unit 212 also measures the signal reception sensitivity of the received first signal (step 510). For example, the control unit 212 can measure a received signal strength indicator (RSSI) and a packet error rate (PER) of the first signal.

Thereafter, the control unit 212 verifies whether the measured reception sensitivity of the first signal is equal to or more than a predetermined reference value "a" (step 520). For example, the control unit 212 can verify whether the received signal strength indicator (RSSI) of the first signal is equal to or more than a predetermined reference strength or the packet error rate (PER) of the first signal is equal to or more than a reference error rate. According to the comparison result, when the reception sensitivity of the first signal is equal to or more than the reference value "a", the control unit 212 can control the RF receiving unit 220 by continuously receiving the first signal transmitted in the first wireless communication scheme.

In addition, when the reception sensitivity of the first signal is less than the reference value "a" (No in step 520), the control unit 212 switches the wireless communication scheme into the second wireless communication scheme (step 530) such that the RF receiving unit 220 receives the second signal from the transmitting apparatus 100 in accordance with the second wireless communication scheme (step 540). For example, the second wireless communication scheme may be WHDi. In this instance, information on the second wireless communication scheme which is the switched wireless communication scheme may be transmitted to the transmitting apparatus 100 such that the transmitting apparatus 100 can transmit the second signal to the receiving apparatus 200 in accordance with the switched second wireless communication scheme.

In addition, the control unit 212 can control the information on the switched second wireless communication scheme to be displayed on the screen to be transmitted to the user, while the information on the second wireless communication scheme may be displayed by using a display unit provided in the receiving apparatus 200 or an external display apparatus. For example, when the wireless communication scheme is switched from WiHD into WHDi in accordance with the method for receiving the signal, a warning message indicating that the resolution of the image may decrease can be displayed to the user.

Further, the user can select whether or not the wireless communication scheme is to be switched into the WHDi, and when the user does not want to switch the wireless communication scheme into WHDi, the receiving apparatus 200 continuously receives and processes the first signal transmitted via WiHD. The received second signal is then provided to the application corresponding to the second wireless communication scheme, and the received second signal is processed in accordance with the second wireless communication scheme corresponding to the second signal as the application is executed.

Also, as discussed above, the receiving apparatus 200 can detect or measure a distance between the receiving apparatus 200 and the transmitting apparatus 100, detect whether there are obstacles blocking or interfering with the communication, and then use this information in selecting the best wireless communication standard to use. Similarly, the transmitting apparatus 100 can measure the distance from the receiving apparatus 100, whether obstacles exist therebetween, etc.

Figure 7:
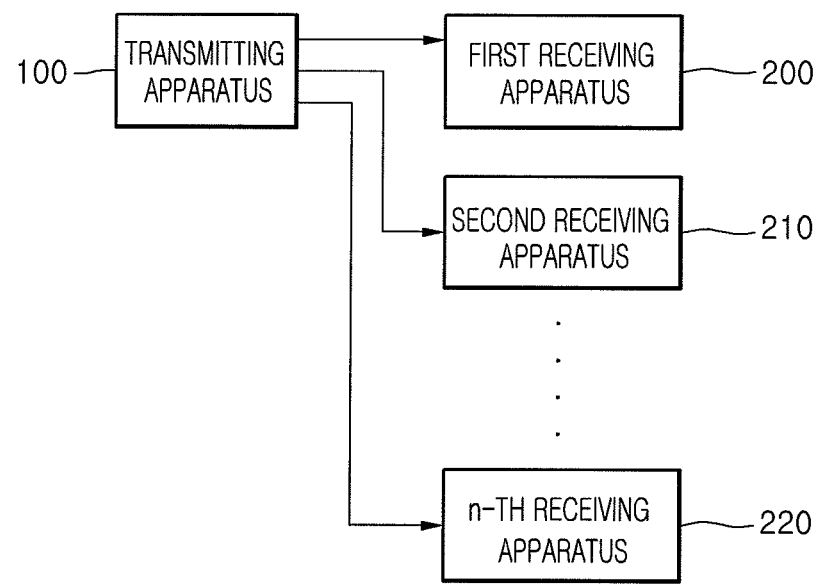
FIGS. 7 and 8 are block diagrams illustrating a signal transmitting/receiving system according to still other embodiment of the present invention.

Next, FIG. 7 is a block diagram illustrating another signal transmitting/receiving system according to another embodiment of the present invention. As shown, the transmitting/receiving system includes the transmitting apparatus 100 and a plurality of receiving apparatuses 200, 210, and 220. Further, the transmitting apparatus 100 may be connected with the plurality of receiving apparatuses 200, 210, and 220 through a wireless network. That is, the transmitting apparatus 100 converts the media signal received from the outside into wirelessly transmittable data, and thereafter wirelessly transmits the data to at least one of the plurality of receiving apparatuses 200, 210, and 220.

For example, the transmitting apparatus 100 may select one or more receiving apparatuses that will receive the media signal among the plurality of receiving apparatuses 200, 210, and 220 from the user and wirelessly transmit the media signal received from the outside to the receiving apparatus selected by the user. To perform this operation, the transmitting apparatus 100 includes a plurality of wireless transmitting units corresponding to the plurality of receiving apparatuses 200, 210, and 220 configured to wirelessly transmit the video and audio data to the receiving apparatuses corresponding thereto.

Further, the wireless communication standards for data transmission/reception may be the same as or different from each other in the plurality of receiving apparatuses 200, 210, and 220. For example, in accordance with the performance or installation position of each of the plurality of receiving apparatuses 200, 210, and 220, the wireless communication standards for the plurality of receiving apparatuses 200, 210, and 220 to receive data may be established to be different from each other. In addition, the transmitting apparatus 100 may include a number smaller than the number of the plurality of receiving apparatuses 200, 210, and 220, for example, one wireless transmitting unit and in this instance, the transmitting apparatus 100 can wirelessly transmit the data using a plurality of channels corresponding to the plurality of receiving apparatuses 200, 210, and 220, that is, using multi-channel communication.

Figure 8:
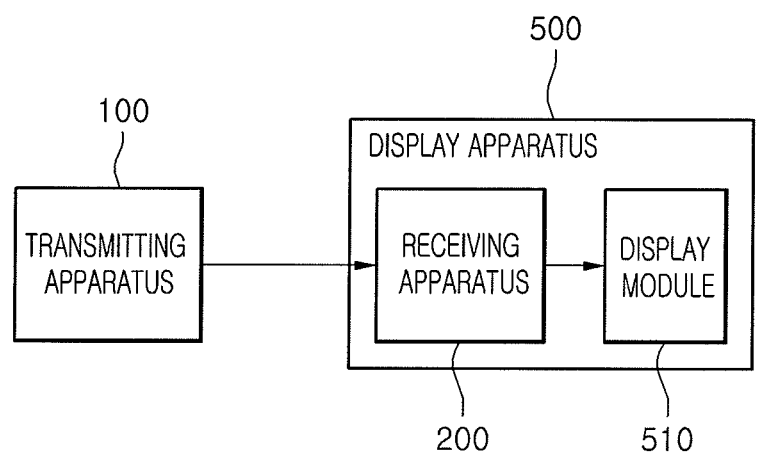

Next, FIG. 8 is a block diagram illustrating a signal transmitting/receiving system according to yet another embodiment of the present invention. As shown in FIG. 8, a display device 600 includes the receiving apparatus 200 having the above-mentioned configuration and a display module 610. That is, the transmitting apparatus 100 receives the media signal from the outside and wirelessly transmits the received media signal to the receiving apparatus 200, and the receiving apparatus 200 provided in the display apparatus 600 processes the wirelessly transmitted data into a video signal of a displayable format and outputs the processed data to the display module 610.

And, the receiving apparatus 200 is detachable to the display device 600.

In addition, the display module 610 may display a video using the video signal input from the receiving apparatus 200. To perform this operation, the display module 610 may include display panels of various display types such as a liquid crystal display (LCD), a plasma display panel (PDP), an electro luminescent display (ELD), a vacuum fluorescent display (VFD), etc. Also, the receiving apparatus 200 can automatically select the best wireless communication method for the particular scenario involved. Thus, the signals can be switched without user intervention.

Further, in another embodiment, the user can set the predetermined reference value "a" in FIG. 6. For example, the receiving apparatus 200 (or a remote control associated with the receiving apparatus 200) can include a dial that the user can rotate to change the value. This is particularly advantageous, because the user can set the reference value based on how many people are in the room, for example, which may affect the reception of the signal. For example, during a sporting event, the user may have many guests, so the user can adjust the sensitivity in real time to provide the best reception method. In addition, the receiving device 200 can be a television connected to the transmitting device 100.

Further, the signal receiving method according to embodiments of the present invention may be stored in a computer-readable recording medium by being produced as a program to be executed in a computer. An example of the computer-readable recording medium includes a ROM, a RAM, a CD-ROM, a magnetic tape, a floppy disk, an optical data storage, etc. and in addition also includes Internet transmissions. In addition, the computer-readable recording media are distributed on computer systems connected through a network, and thus a computer-readable code may be stored and executed by a distribution scheme. Also, a functional program, a code, and code segments for implementing the signal receiving method will be easily interred by programmers skilled in the art.

According to embodiments of the present invention, a transmitting apparatus and a receiving apparatus that transmits and receives video and audio signals using wireless communication, respectively can provide the optimum signal transmission/reception performance depending on a distance between the transmitting and receiving apparatuses, an installation space, or the resolution of an image by supporting a plurality of wireless communication schemes, thereby improving the quality of a displayed image.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of controlling devices, the method comprising:
converting, via a transmitting apparatus, a signal including at least one of video/audio and data into a first definition wireless signal;
transmitting, via the transmitting apparatus, the converted first definition wireless signal to a receiving apparatus;
receiving, via the receiving apparatus, the first definition wireless signal;
extracting, via the receiving apparatus, said at least one of the video/audio and data included in the first definition wireless signal;
detecting, via a detector on the receiving apparatus, a quality of the received first definition wireless signal;
comparing, via a processor on the receiving apparatus, the detected quality of the received first definition wireless signal with a predetermined value, and displaying information on a second definition wireless signal including a warning message indicating that a resolution of an image on a display unit of a television may decrease, when the detected quality of the received first definition wireless signal is lower than the predetermined value, said first and second definition wireless signals using different wireless communication standards; and
transmitting a first command to the transmitting apparatus to transmit a second definition wireless signal including said at least one of the video/audio and data to the receiving apparatus, when a selection signal to switch the first definition wireless signal into the second definition wireless signal is received, and continuously receiving and processing the first definition wireless signal, when the selection signal to switch the first definition wireless signal into the second definition wireless signal is not received.

2. The method of claim 1, wherein the first wireless definition signal is one of a wireless HD (WiHD) signal, a wireless home digital interface (WHDi) signal and a WiFi signal, and the second wireless definition signal is another of said one of the wireless HD (WiHD) signal, the wireless home digital interface (WHDi) signal and the WiFi signal.

3. The method of claim 1, further comprising:
measuring a received signal strength indicator (RSSI) of each of the first and second definition wireless signals;
selecting one of the first and second definition wireless signals that has the higher measured received signal strength indicator (RSSI); and
transmitting a second command to the transmitting apparatus to transmit the selected one of the first and second definition wireless signals that has the higher measured received signal strength indicator (RSSI) to the receiving apparatus.

4. The method of claim 1, further comprising:
measuring a packet error rate (PER) of each of the first and second definition wireless signals;
selecting a signal having the lower measured packet error rate (PER) of the first and second definition wireless signals; and
transmitting a second command to the transmitting apparatus to transmit the selected one of the first and second definition wireless signals that has the lower measured packet error rate (PER) to the receiving apparatus.

5. The method of claim 1, further comprising:
receiving a selection signal indicating a selection of one of the first and second definition wireless signals; and
transmitting a second command to the transmitting apparatus to transmit the selected one of the first and second definition wireless signals.

6. The method of claim 1, wherein the processor on the receiving apparatus automatically compares the detected quality of the received first definition wireless signal with the predetermined value and transmits the first command to the transmitting apparatus to transmit the second definition wireless signal without user intervention.

7. The method of claim 1, further comprising:
outputting said at least one of the video/audio and data included in at least one of the first and second definition wireless signals on the receiving apparatus.

8. The method of claim 1, further comprising:
detecting a distance between the transmitting apparatus and the receiving apparatus; and
selecting one of the first and second definition wireless signals based on the detected distance.

9. A system for controlling devices, the system comprising:
a transmitting apparatus receiving a signal including at least one of the video/audio and data, converting the received signal into a first definition wireless signal, and transmitting the converted first definition wireless signal; and
a receiving apparatus receiving the first definition wireless signal from the transmitting apparatus, extracting said at least one of the video/audio and data included in the first definition wireless signal, and outputting said at least one of the video/audio and data included in the first definition wireless signal on a television,
wherein the receiving apparatus includes a detector detecting a quality of the received first definition wireless signal and a processor comparing the detected quality of the received first definition wireless signal with a predetermined value,
wherein the processor displays information on a second definition wireless signal including a warning message indicating that a resolution of an image on a display unit of the television may decrease, when the detected quality of the received first definition wireless signal is lower than the predetermined value, said first and second definition wireless signals using different wireless communication standards, and
wherein the receiving apparatus transmits a first command to the transmitting apparatus to transmit a second definition wireless signal including said at least one of the video/audio and data to the receiving apparatus, when a selection signal to switch the first definition wireless signal into the second definition wireless signal is received, and continuously receives and processes the first definition wireless signal, when the selection signal to switch the first definition wireless signal into the second definition wireless signal is not received.

10. The system of claim 9, wherein the first wireless definition signal is one of a wireless HD (WiHD) signal, a wireless home digital interface (WHDi) signal and a WiFi signal, and the second wireless definition signal is another of said one of the wireless HD (WiHD) signal, the wireless home digital interface (WHDi) signal and the WiFi signal.

11. The system of claim 9, wherein the processor included in the receiving apparatus measures a received signal strength indicator (RSSI) of each of the received first and second definition wireless signals, and selects one of the first and second definition wireless signals that has the higher measured received signal strength indicator (RSSI), and
wherein the receiving apparatus transmits a second command to the transmitting apparatus to transmit the selected one of the first and second definition wireless signals that has the higher measured received signal strength indicator (RSSI) to the receiving apparatus.

12. The system of claim 9, wherein the processor included in the receiving apparatus measures a packet error rate (PER) of each of the received first and second definition wireless signals, and selects a signal having the lower measured packet error rate (PER) of the first and second definition wireless signals, and
wherein the receiving apparatus transmits a second command to the transmitting apparatus to transmit the selected one of the first and second definition wireless signals that has the lower measured packet error rate (PER) to the receiving apparatus.

13. The system of claim 9, wherein the receiving apparatus further comprises:
an input unit receiving a selection signal indicating a selection of one of the first and second definition wireless signals, and
wherein the receiving apparatus transmits a second command to the transmitting apparatus to transmit the selected input one of the first and second definition wireless signals.

14. The system of claim 9, wherein the processor included in the receiving apparatus automatically compares the detected quality of the received first definition wireless signal with the predetermined value and transmits the first command to the transmitting apparatus to transmit the second definition wireless signal without user intervention.

15. The system of claim 9, wherein the receiving apparatus is detachable to the television.

16. The system of claim 9, wherein the receiving apparatus is included in the television.

17. A television, comprising:
a receiver receiving a first definition wireless signal including at least one of video/audio and data from an external device;
a processor extracting said at least one of the video/audio and data included in the first definition wireless signal; and
an output device outputting said at least one of the video/audio and data included in the first definition wireless signal, wherein the processor detects a quality of the received first definition wireless signal, compares the detected quality of the received first definition wireless signal with a predetermined value, displays information on a second definition wireless signal including a warning message indicating that a resolution of an image on a display unit of the television may decrease, when the detected quality of the received first definition wireless signal is lower than the predetermined value, said first and second definition wireless signals using different wireless communication standards, transmits a first command to a transmitting apparatus associated with the external device to transmit a second definition wireless signal including said at least one of the video/audio and data to the television, when a selection signal to switch the first definition wireless signal into the second definition wireless signal is received, and continuously receives and processes the first definition wireless signal, when the selection signal to switch the first definition wireless signal into the second definition wireless signal is not received.

18. The television of claim 17, wherein the receiver is detachable to the television.

19. The television of claim 17, wherein the first wireless definition signal is one of a wireless HD (WiHD) signal, a wireless home digital interface (WHDi) signal and a WiFi signal, and the second wireless definition signal is another of said one of the wireless HD (WiHD) signal, the wireless home digital interface (WHDi) signal and the WiFi signal.

20. The television of claim 17, wherein the processor detects a distance between the transmitting apparatus and the television, and selects one of the first and second definition wireless signals based on the detected distance.

21. The television of claim 17, further comprising:
an input unit receiving a selection signal indicating a selection of one of the first and second definition wireless signals,
wherein the television transmits a second command to the transmitting apparatus to transmit the selected input one of the first and second definition wireless signals.

22. A method of controlling devices, the method comprising:
converting, via a transmitting apparatus, a signal including at least one of video/audio and data into a first definition wireless signal;
transmitting, via the transmitting apparatus, the converted first definition wireless signal to a plurality of receiving apparatuses;
receiving, via the plurality of receiving apparatuses, the first definition wireless signal;
extracting, via the plurality of receiving apparatuses, said at least one of the video/audio and data included in the first definition wireless signal;
detecting, via a detector on the plurality of receiving apparatuses, a quality of the received first definition wireless signal;
comparing, via a processor on the plurality of receiving apparatuses, the detected quality of the received first definition wireless signal with a predetermined value, and displaying information on a second definition wireless signal including a warning message indicating that a resolution of an image on a display unit of a television may decrease, when the detected quality of the received first definition wireless signal is lower than the predetermined value, said first and second definition wireless signals using different wireless communication standards;

transmitting a first command to the transmitting apparatus to transmit a second definition wireless signal including said at least one of the video/audio and data to the plurality of receiving apparatuses, when a selection signal to switch the first definition wireless signal into the second definition wireless signal is received, and continuously receiving and processing the first definition wireless signal, when the selection signal to switch the first definition wireless signal into the second definition wireless signal is not received;
detecting a distance between the transmitting apparatus and the plurality of receiving apparatuses; and
selecting one of the first and second definition wireless signals based on the detected distance,
wherein the transmitting apparatus comprises a plurality of wireless transmitting units corresponding to the plurality of receiving apparatuses wirelessly transmitting the video/audio and data to the plurality of receiving apparatuses corresponding thereto.

23. A system for controlling devices, the system comprising:
a transmitting apparatus receiving a signal including at least one of the video/audio and data, converting the received signal into a first definition wireless signal, and transmitting the converted first definition wireless signal; and
a plurality of receiving apparatuses receiving the first definition wireless signal from the transmitting apparatus, extracting said at least one of the video/audio and data included in the first definition wireless signal, and outputting said at least one of the video/audio and data included in the first definition wireless signal on a television,
wherein the plurality of receiving apparatuses includes a detector detecting a quality of the received first definition wireless signal and a processor comparing the detected quality of the received first definition wireless signal with a predetermined value,
wherein the processor displays information on a second definition wireless signal including a warning message indicating that a resolution of an image on a display unit of the television may decrease, when the detected quality of the received first definition wireless signal is lower than the predetermined value, said first and second definition wireless signals using different wireless communication standards,
wherein the plurality of receiving apparatuses transmits a first command to the transmitting apparatus to transmit a second definition wireless signal including said at least one of the video/audio and data to the plurality of receiving apparatuses, when a selection signal to switch the first definition wireless signal into the second definition wireless signal is received, and continuously receives and processes the first definition wireless signal, when the selection signal to switch the first definition wireless signal into the second definition wireless signal is not received,
wherein the detector included in each of the plurality of receiving apparatuses detects a distance between the transmitting apparatus and the plurality of receiving apparatuses,
wherein the processor included in each of the plurality of receiving apparatuses selects one of the first and second definition wireless signals based on the detected distance, and wherein, the transmitting apparatus comprises a plurality of wireless transmitting units or a plurality of channels corresponding to the plurality of receiving apparatuses wirelessly transmitting the video/audio and data to the receiving apparatuses corresponding thereto.

* * * * *